US009036981B2

(12) United States Patent
Barton et al.

(10) Patent No.: US 9,036,981 B2
(45) Date of Patent: *May 19, 2015

(54) METHOD AND APPARATUS FOR ADVERTISEMENT PLACEMENT IN A USER DIALOG ON A SET-TOP BOX

(75) Inventors: James M. Barton, Alviso, CA (US); Paul Stevens, Felton, CA (US); David Sandford, Berkeley, CA (US); Robin Hayes, Palo Alto, CA (US); Margret Schmidt, Redwood City, CA (US)

(73) Assignee: TiVo Inc., Alviso, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/602,027

(22) Filed: Aug. 31, 2012

(65) Prior Publication Data
US 2012/0328263 A1 Dec. 27, 2012

Related U.S. Application Data

(63) Continuation of application No. 11/474,039, filed on Jun. 23, 2006, now Pat. No. 8,261,300.

(51) Int. Cl.
*H04N 5/93* (2006.01)
*G11B 27/00* (2006.01)
(Continued)

(52) U.S. Cl.
CPC ....... *H04N 21/472* (2013.01); *H04N 21/47217* (2013.01); *G06Q 30/0241* (2013.01); *H04N 5/76* (2013.01); *H04N 5/765* (2013.01);
(Continued)

(58) Field of Classification Search
USPC ...................................... 386/230, E5.07, 290
See application file for complete search history.

(56) References Cited

U.S. PATENT DOCUMENTS 5,974,398 A 10/1999 Hanson et al.
6,282,713 B1 8/2001 Kitsukawa et al.
(Continued)

FOREIGN PATENT DOCUMENTS

JP 2002185891 A 6/2002
JP 2002320217 A 10/2002
(Continued)

OTHER PUBLICATIONS

Japan Patent Office, "Decision of Rejection" in application No. 2009-516574 dated Nov. 29, 2012, 4 pages.
(Continued)

*Primary Examiner* — Hung Dang
*Assistant Examiner* — Girumsew Wendmagegn
(74) *Attorney, Agent, or Firm* — Wong & Rees LLP

(57) ABSTRACT

Methods and apparatuses for presenting targeted advertisements to DVR users are described. After a DVR has finished playing a recorded television program, or in response to other specified events, the DVR presents a screen which comprises a "save or delete" menu. In addition to the "save" and "delete" options, the menu additionally comprises one or more other options. Each of these other options may correspond to a separate promotional item. For example, a user's selection of such an option may cause the DVR to display or play an advertisement on the user's television set. Additionally or alternatively, these other options, when selected by a user, may cause the DVR to display a user interface through which the user can actually purchase a product or service. The product or service advertised or offered may be one that was featured or referenced in the television program that the user was just watching.

26 Claims, 6 Drawing Sheets

(51) Int. Cl.
    *H04N 21/472* (2011.01)
    *G06Q 30/02* (2012.01)
    *H04N 5/76* (2006.01)
    *H04N 21/4147* (2011.01)
    *H04N 21/432* (2011.01)
    *H04N 21/4335* (2011.01)
    *H04N 21/45* (2011.01)
    *H04N 21/458* (2011.01)
    *H04N 21/488* (2011.01)
    *H04N 21/81* (2011.01)
    *H04N 21/482* (2011.01)
    *H04N 5/765* (2006.01)
    *H04N 5/775* (2006.01)
    *H04N 5/781* (2006.01)
    *H04N 5/907* (2006.01)

(52) U.S. Cl.
    CPC ............ *H04N 5/775* (2013.01); *H04N 5/7755* (2013.01); *H04N 5/781* (2013.01); *H04N 5/907* (2013.01); *H04N 21/4147* (2013.01); *H04N 21/4325* (2013.01); *H04N 21/4335* (2013.01); *H04N 21/4532* (2013.01); *H04N 21/458* (2013.01); *H04N 21/4882* (2013.01); *H04N 21/812* (2013.01); *H04N 21/432* (2013.01); *H04N 21/482* (2013.01)

(56) References Cited

U.S. PATENT DOCUMENTS

| | | |
|---|---|---|
| 2001/0001160 A1 | 5/2001 | Shoff et al. |
| 2001/0049824 A1 | 12/2001 | Baker et al. |
| 2002/0174430 A1* | 11/2002 | Ellis et al. .................. 725/46 |
| 2002/0188944 A1 | 12/2002 | Noble |
| 2003/0131357 A1 | 7/2003 | Kim |
| 2003/0208767 A1 | 11/2003 | Williamson et al. |
| 2004/0031058 A1 | 2/2004 | Reisman |
| 2004/0133914 A1 | 7/2004 | Smith et al. |
| 2005/0022226 A1 | 1/2005 | Ackley et al. |
| 2007/0124768 A1 | 5/2007 | Morris |
| 2010/0138868 A1* | 6/2010 | Sie et al. .................. 725/46 |
| 2013/0318552 A1 | 11/2013 | Barton et al. |

FOREIGN PATENT DOCUMENTS

| | | |
|---|---|---|
| WO | WO 00/59220 A1 | 10/2000 |
| WO | WO 01/76249 A1 | 10/2001 |
| WO | WO 02069636 A | 9/2002 |

OTHER PUBLICATIONS

Current Claims in Japan application No. 2009-516574 dated Nov. 2012, 2 pages.
European Patent Office, "Search Report" in application No. 12175982.3-1955, dated Aug. 27, 2013, 6 pages.
Current Claims in application No. 12175982.3-1955, dated Aug. 2013, 3 pages.
Canadian Intellectual Property, Office Action, in application No. 2,653,502, dated Sep. 6, 2013, 2 pages.
Current Claims in application No. 2,653,502, dated Sep. 2013, 2 pages.
European Patent Office, "Search Report" in application No. 06 785 755.7-1955, dated Feb. 25, 2014, 6 pages.
Current Claims in application No. 09 785 755.7-1955, dated Feb. 25, 2014, 6 pages.
Chinese Patent Office, Application No. 200680055081.9, Foreign Office Action dated Nov. 26, 2014.
Chinese Patent Office, Application No. 200680055081.9, Pending Claims as of Nov. 26, 2014.

\* cited by examiner

METHOD AND APPARATUS FOR ADVERTISEMENT PLACEMENT IN A USER DIALOG ON A SET-TOP BOX

CROSS REFERENCE TO RELATED APPLICATIONS AND CLAIM OF PRIORITY

The present application claims priority as a continuation of U.S. patent application Ser. No. 11/474,039, filed on Jun. 23, 2006 now U.S. Pat. No. 8,261,300, the entire contents of which is hereby incorporated by reference, under 35 U.S.C. §120, for all purposes as though fully stated herein. The applicants hereby rescind any disclaimer of claim scope in the parent applications or the prosecution history thereof and advise the USPTO that the claims in this application may be broader than any claim in the parent applications.

FIELD OF THE INVENTION

The present invention relates to displaying targeted advertisements through digital video recorders (DVRs).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record television programs. DVRs eliminate the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

At least one such DVR automatically records several television programs in advance of the time that a user will watch those television programs. After one or more television programs have been recorded and stored on a hard drive, the DVR presents, to the user, through the television set, a user interface that identifies the television programs which currently are available for viewing. This user interface comprises a menu that allows the user to select, using a remote control device for the DVR, one of the currently recorded television programs. In DVRs produced by TiVo Inc., this menu is often called the "now playing" menu.

After a user selects a recorded television program, the DVR plays the selected television program to the user by reading the appropriate digital recording from the hard drive and sending a corresponding signal to the television set. While the television program is being played to the user, the DVR also receives signals from the user's remote control. Through the remote control, a user can instruct the DVR to perform various operations relative to the television program. For example, the user can instruct the DVR to play the television program backward for a desired period of time ("rewind"). The user can play the television program forward with greater than usual speed ("fast forward"). The user can play the television program forward with slower than usual speed. The user can cause the currently displayed video frame of the television program to be displayed indefinitely ("pause"), or stop the playing of the television program entirely. In this manner, the user can temporally traverse the television program however the user likes.

Although modern DVRs typically are equipped with hard drives that can store very large quantities of data, these hard drives are still limited in the quantity of data that they can store. In order to free space on the hard drive so that additional television programs can be recorded, some DVRs present a "save or delete" menu (or "dialog") to the user after a recorded television program has been played in its entirety. The menu gives the user the options of deleting the recorded television program from the DVR's hard drive or retaining the recorded television on the DVR's hard drive for later viewing. The user can select one of these options using the remote control. In response to the user's selection, the DVR saves or deletes the television program in accordance with the user's selection. In response to a user's selection of the "delete" option, the program may be "deleted" as perceived by the user; the program might not actually be deleted from persistent storage such as a hard drive at that point.

This system for freeing space on the hard drive works well. However, it may be observed that the "save or delete" menu, being limited in the number of options that need to be presented to the user, does not occupy much of the frame in which it is displayed. One might even consider the unused space in such a frame—in which no meaningful content is presented—and consider that space to be something of a wasted opportunity. One might especially consider that space to be a wasted opportunity when one realizes that, at the time the "save or delete" menu is presented, the user has just finished viewing a television program in which various products of various companies might have been shown. The memories of these products may still be fresh in the user's mind when the television program finishes, but these memories tend to fade fast.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
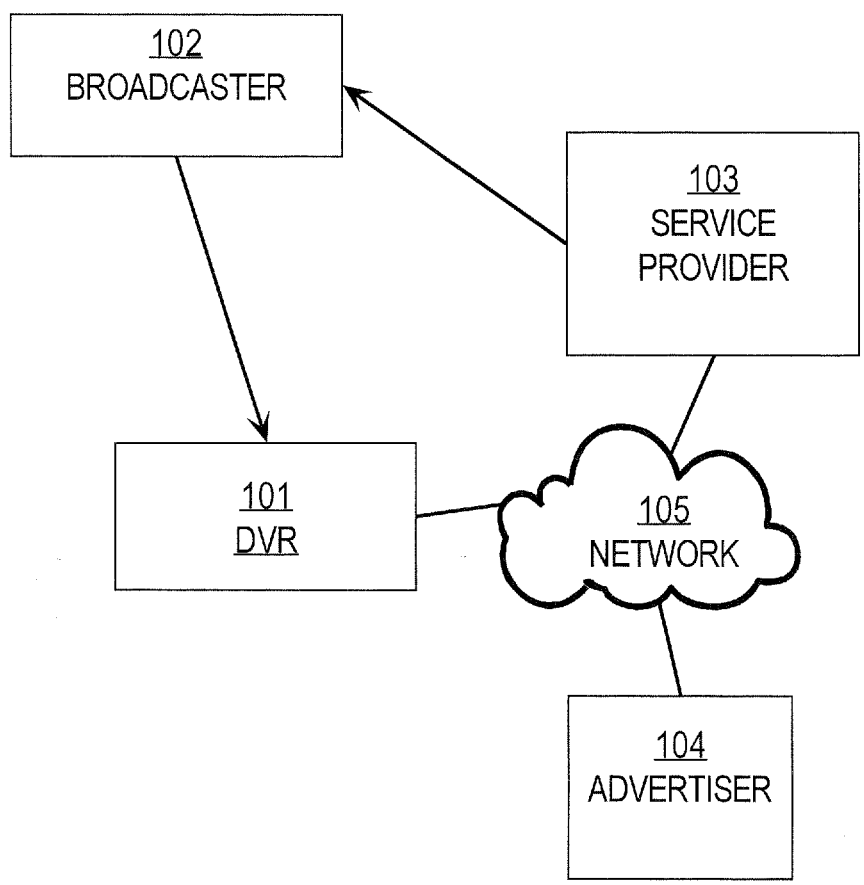
FIG. 1 is a block diagram that illustrates a system in which enhanced promotional information is presented to a user in response to the occurrence of certain events, such as the completion of the playing of a recorded television program, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 General Overview
2.0 System Structural Overview
3.0 Example Techniques
   3.1 Save/Delete Menu Screen Alternatives
   3.2 Deriving Revenue from DVR-Placed Advertising
   3.3 Automated Bidding for Menu Option Slots
   3.4 Tagging Television Programs with Advertisement IDs
   3.5 Adjusting Menu Options Based on Hit Rates
   3.6 Offers to Record Similar Television Programs
   3.7 Pay-Per-View Implementations
   3.8 Dynamic Advertisement Selection
4.0 Implementation Mechanisms—Hardware Overview 1.0 General Overview According to one embodiment of the invention, after a DVR has finished playing a recorded or downloaded television program, or in response to other specified events, the DVR presents, to a user who was watching the recorded or downloaded television program, a screen which comprises a "save or delete" menu. The menu comprises a "save" option that, if selected, causes the DVR to maintain the recorded or downloaded television program on the DVR's hard drive. A title and/or other description of the program may be retained in the DVR's user interface in response to the selection of the "save" option, thereby making the program available to the user for later viewing. The menu also comprises a "delete" option that, if selected, causes the DVR to "free" the space on the DVR's hard drive that was being used to store the recorded or downloaded television program. In "freeing" this space, the space may be designated as being available to record other television programs; the previously recorded television program might not actually be removed from the hard drive until it is overwritten by another recorded television program. In response to a user's selection of the "delete" option, the program may be "deleted" as perceived by the user; the program might not actually be deleted from persistent storage such as a hard drive at that point.

According to one embodiment of the invention, in addition to the "save" and "delete" options, the menu additionally comprises one or more other options. In one embodiment of the invention, each of these other options corresponds to a separate promotional item. For example, a user's selection of such an option may cause the DVR to display or play an advertisement on the user's television set.

An "advertisement" usually is information about a product, service, brand, company, political movement, public cause, etc. The advertisement may be, but does not need to be, associated with a selling entity that is, itself, a person or a company. Advertisements sometimes are designed specifically to publicize a selling entity's product or service with the ultimate goal of generating business and/or revenue for the selling entity. Such advertisements may be referred to specifically as "business advertisements." However, other advertisements may be associated with, provided by, or feature a person or organization that has a non-business or non-revenue motive. For example, advertisements may be political advertisements. Advertisements may promote or feature, as their subjects, public causes, public service announcements, and/or educational information. Advertisements may be informative in nature.

Besides the "save" and "delete" options, the menu might contain an option that says "tell me more about . . . " followed by the name of a product, service, company, brand, person, public cause, etc. Additionally or alternatively, the menu might contain an option which offers to send a brochure or other information to the viewer's home address (on file with the DVR service company) and/or the viewer's e-mail address. When a viewer selects such an option, the DVR may store an indication of the viewer's selection. On a periodic basis (e.g., daily, weekly, or monthly), the DVR may bundle these selection indications together, encrypt the bundle, and send the bundle to a fulfillment center which ensures that the brochures and/or information associated with the selection indications are sent as requested.

An advertisement may be provided by and originate with the DVR service provider rather than another party. For example, a DVR service company might donate space for advertisements during a political campaign season. For another example, a DVR service company might take advantage of its control of the manner in which advertisements are selected in order to advertise its own products and services.

An advertisement may comprise a still image, video, audio, video accompanied by audio, text, and/or any combination of these. An advertisement may be interactive, such that the advertisement's behavior is based at least to some extent upon user input. Such an advertisement may be downloaded or broadcast from a remote source and stored within the DVR prior to the time that a user selects the option discussed above, or in response to the user's selection of the option. In one embodiment of the invention, the advertisement's content is designed to publicize a product or service that was shown, heard, or otherwise referenced in the recorded television program that the user was just watching.

In one embodiment of the invention, the options accompanied by the "save" and "delete" options include options that, when selected by a user, cause the DVR to display a user interface through which the user can actually purchase a product or service. Once again, the product or service may be one that was featured or referenced in the recorded television program that the user was just watching.

For example, besides the "save" and "delete" options, the menu might contain one or more options that say, or are labeled, "buy . . . " followed by the name of a product or service. The options may be visually displayed and/or audibly spoken. In response to a user's selection of such an option, the DVR may display a user interface. The user can view a list of products and/or services, and the prices of each, within the user interface. Through the user interface, the user can select a product or service for purchase and then supply payment information (e.g., credit card information) and delivery information (e.g., shipping address information). The DVR may upload the payment information and delivery information to a remote source. For another example, through the user interface, the user can approve the addition of an item to a "shopping cart" that is associated with a particular website. The DVR may responsively instruct the particular website (e.g., via the Internet) to add the item to the "shopping cart" associated with the user's account on the particular website. Later, the user may use his computer to log on to the website and complete the transaction—for example, by purchasing the item that was added to the "shopping cart" via the DVR. For another example, the DVR may send, to the user's e-mail account, an e-mail message that contains a coded URL. The URL may allow the user to complete the purchase on the particular website.

For another example, besides the "save" and "delete" options, the menu might contain one or more options that contain questions to which the user may submit a response. For example, a menu option might say, "How would you rate" and then identify a program, an actor, a product, a service, etc.

In one embodiment of the invention, instead of or in addition to the options discussed above, the same DVR-generated screen which contains the "save and delete" menu additionally comprises one or more actual advertisements that the DVR displays or plays concurrently with the display of the menu. In one embodiment of the invention, instead of or in addition to the options discussed above, the same DVR-generated screen which contains the "save and delete" menu additionally comprises an interface through which the DVR's user can actually purchase a product or service as described above.

At least some embodiments of the invention described above are highly beneficial for several reasons. Because the advertisements and/or menu options may be presented to a DVR user very shortly after the user has finished, or nearly finished, viewing a recorded or downloaded television program that featured or referenced a product or service, the product or service will still be fresh in the user's mind. This freshness increases the probability that the user will be interested in learning more about the product or service and/or purchasing the product or service.

Additionally, because the advertisements and/or menu options may be presented to the user after the presentation of the recorded or downloaded television program rather than during the presentation of the recorded or downloaded television program, the user is less likely to be irritated by the presentation of the advertisements and/or menu options. The user's viewing experience does not need to be interrupted or altered by the presentation of the advertisements. The presentation of the advertisements and/or menu options is minimally invasive. Moreover, because the advertisements and/or menu options do not need to be presented within copyrighted television programs, copyright issues may be avoided.

Furthermore, because the advertisements and/or menu options may be presented within the same screen that already comprises the "save or delete" menu, at least some embodiments of the invention can be implemented with very little modification to existing DVRs. Minor upgrades to the software executing on the DVRs can be uploaded to the DVRs, thereby causing the DVRs to present enhanced promotional information on previously existing screens. Users who are already familiar with the "save or delete" menu are unlikely to be confused merely by the addition of such enhanced promotional information to the screens which they already expect to see when a recorded or downloaded television program finishes playing.

Embodiments of the invention summarized above are described below in greater detail, along with some alternative embodiments of the invention.

2.0 System Structural Overview

FIG. 1 is a block diagram that illustrates a system in which enhanced promotional information is presented to a user in response to the occurrence of certain events, such as the completion of the playing of a recorded television program, according to one embodiment of the invention. The system comprises DVR 101, which is communicatively coupled to a network 105 such as the Internet, Local Area Network (LAN), and/or Wide Area Network (WAN), through any proper communication interface, such as an Ethernet or other communications port. DVR 101 may initiate a connection to network 105. In one embodiment of the invention, DVR 101 connects to network 105 through an RJ-11 port, to connect via a dial-up modem. In one embodiment of the invention, DVR 101 connects to network 105 through a USB port for a wireless or wired Ethernet adapter. In one embodiment of the invention, DVR 101 connects to network 105 through a direct Ethernet connection. The functionality of a DVR is typified in U.S. Pat. No. 6,233,389, which is owned by the Applicant and is hereby incorporated by reference.

Alternatively, DVR 101 can be any set-top box that is capable of receiving broadcast program content. Although some embodiments of the invention are described in the context of DVRs specifically, embodiments of the invention also are applicable to and capable of being implemented in other multimedia devices. As used herein, the phrase "multimedia device" is a device that can record and play motion video. Multimedia devices include DVRs and MP3 players, among other devices. DVRs may be referred to, alternatively, as Personal Video Recorders (PVRs) and/or Digital Media Recorders (DMRs), and may stand alone or may be combined with multimedia receivers from cable companies, satellite companies, telephone companies, Internet companies, and/or other providers of multimedia information.

In one embodiment of the invention, a broadcaster 102 provides broadcast program content to DVR 101 via cable, satellite, terrestrial communication, or other transmission methods. As used herein, "broadcast program content" includes any multimedia content, such as audio, image, or video content, for example. Television programs are an example of such broadcast program content. Broadcaster 102 may provide broadcast program content to DVR 101 in the form of one or more content streams. In an alternative embodiment of the invention, DVR 101 downloads a digitally encoded television program from broadcaster 102 via the Internet; the television program does not need to be broadcast using conventional television broadcast methods.

An advertiser 104 may provide additional content to service provider 103. For example, advertiser 104 or broadcaster 102 may provide brand advertisements (e.g., commercials, videos, images, text, etc.) to service provider 103. Service provider 103 may associate the advertisements with broadcast programming content that is to be transmitted to DVR 101 by broadcaster 102.

In one embodiment of the invention, DVR 101 periodically downloads advertisements and/or other promotional information from service provider 103 through network 105. For example, DVR 101 may periodically download and store menu options that are to be presented within a "save or delete" menu that is to be presented at the conclusion of a television program, as discussed above. Additionally or alternatively, advertisements and/or other promotional information may be downloaded in response to the occurrences of specified events; for example, in response to the user's viewing of the end of a program, DVR 101 may download an advertisement that is associated with the program. Besides being downloaded, DVR 101 may receive and store advertisements and/or other promotional information that have been broadcast to DVR 101. Each advertisement and menu option downloaded or broadcast to DVR 101 may be expressly associated with one or more content streams. Each such content stream may represent a separate television program.

In one embodiment of the invention, DVR 101 communicates with service provider 103. Service provider 103 provides program guide data, graphical resources such as brand icons and pictures, service information, software programs, advertisements, and other forms of data to DVR 101. Service provider 103 provides, to DVR 101, data that enables DVR 101 to operate independently of service provider 103, so that DVR 101 can perform autonomous recording functions. In one embodiment of the invention, communications between DVR 101 and service provider 103 flow through a secure distribution architecture so that the user's privacy and all data are protected from eavesdroppers.

Figure 2:
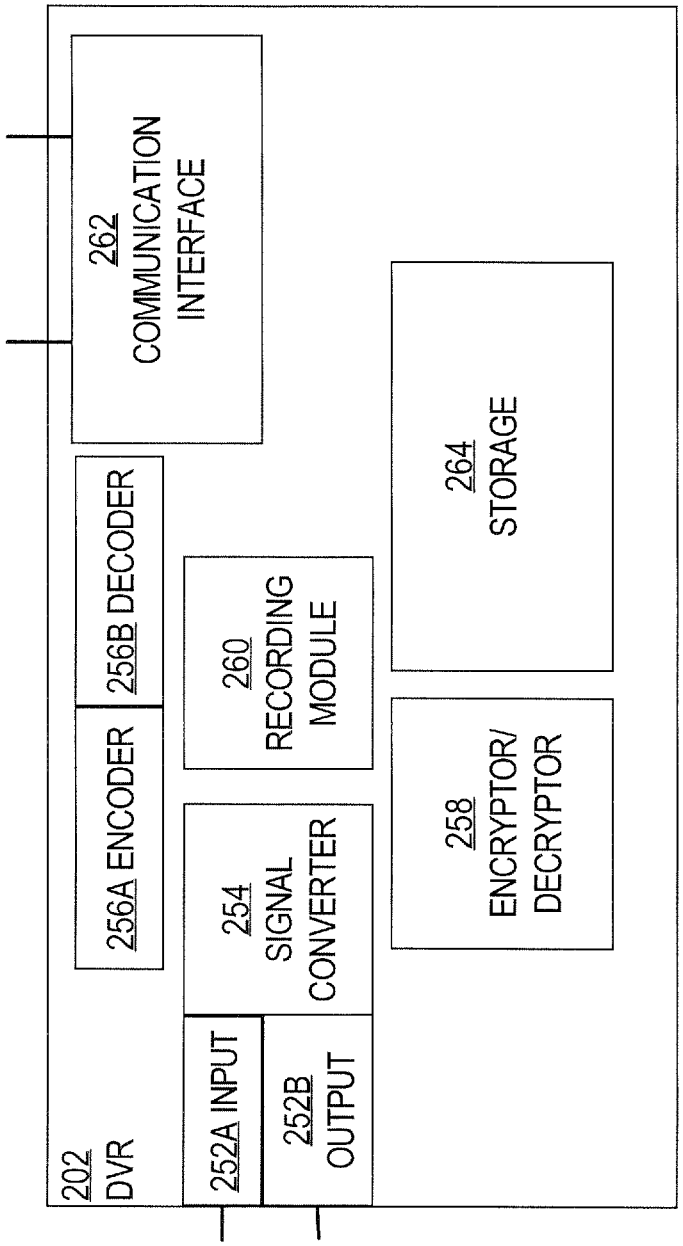
FIG. 2 is a block diagram that illustrates an overview of the internal structure and components of a DVR, according to one embodiment of the invention.

FIG. 2 is a block diagram that illustrates an overview of the internal structure and components of a DVR, according to one embodiment of the invention. Although FIG. 2 illustrates some of the components that may be present in a DVR, in some embodiments of the invention, DVRs may comprise fewer or more components than are shown in FIG. 2.

In one embodiment of the invention, DVR 202 comprises a signal converter 254. Signal converter 254 comprises components that digitize an analog television signal into a digital data stream. Signal converter 254 also can accept a digital data stream as input.

DVR 202 can receive broadcast signals from an antenna, a cable TV system, a satellite receiver, and/or other receiving mechanisms, via input 252A. Input 252A may comprise a plurality of tuning modules that allow a plurality of signals to be received and recorded simultaneously.

Recording module 260 records incoming content streams by storing the content streams on at least one storage facility, such as storage 264. Storage 264 may be a hard disk drive, for example. Storage 264 also may comprise other forms of storage media, such as flash memory, for example. Storage 264 is designed to preserve segments of the content streams at least temporarily. Storage 264 may be internal to and/or external to DVR 202. Signal converter 254 retrieves segments of a stored content stream, converts the content stream into an analog signal, and then modulates the signal onto a radio frequency (RF) carrier. The analog signal is then delivered to a television set through output 252B.

Alternatively, output 252B may deliver a digital signal to a television set or video monitor. For example, DVR 202 may utilize a Digital Visual Interface (DVI) port for sending digital signals to a television set or video monitor via a DVI cable. For another example, DVR 202 may utilize a High Definition Multimedia Interface (HDMI) port for sending digital signals to a television set or video monitor via an HDMI cable.

DVR 202 also comprises a communication interface 262 through which DVR 202 communicates over network 105 via Ethernet, wireless network, modem, or other communications mechanism. DVR 202 may be integrated into a television system such that the components described above are housed in a television set capable of performing the functions of each component of DVR 202.

In one embodiment of the invention, DVR 202 comprises a plurality of components that are designed to receive, record, store, transfer and playback digital data signals from a plurality of sources, such as a personal computer (PC), another DVR, a service provider, and/or a content server. In one embodiment of the invention, DVR 202 can transfer digital data signals to another DVR or a PC. Using encoder 256A and decoder 256B, DVR 202 may encode and decode digital signals into a variety of formats for playback, storage, or transfer. Using encryptor/decryptor 258, DVR 202 can encrypt or decrypt digital data signals for the secure storage, transfer or playback of the digital data signals.

3.0 Example Techniques

Figure 3:
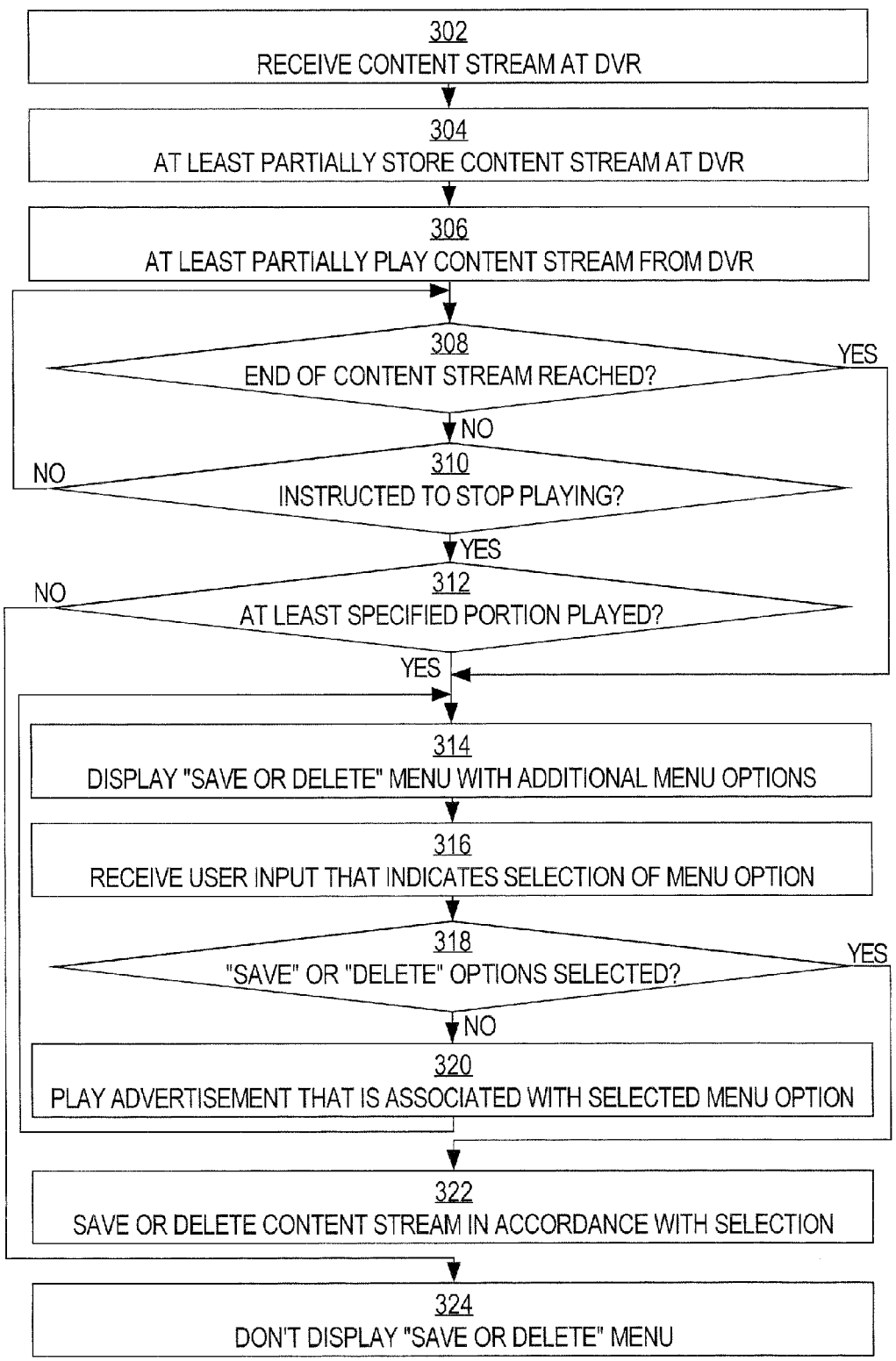
FIG. 3 is a flow diagram that illustrates the steps of a technique through which a DVR presents promotional information to a DVR user in response to the occurrence of certain events, such as the completion of the playing of a recorded television program, according to one embodiment of the invention.

FIG. 3 is a flow diagram that illustrates the steps of a technique through which a DVR presents promotional information to a DVR user in response to the occurrence of certain events, such as the completion of the playing of a recorded television program, according to one embodiment of the invention. The technique described below may be performed by DVR 101, for example. In various alternative embodiments of the invention, more or fewer steps than those shown in FIG. 3 may be performed.

In block 302, a content stream is received. The content stream typically represents a television program. For example, DVR 101 may receive a content stream from broadcaster 102 over a cable, via a satellite dish, or via the Internet. Broadcaster 102 may "push" the content stream to DVR 101, or DVR 101 may "pull" the content stream from broadcaster 102.

In block 304, the content stream is at least partially stored. For example, DVR 101 may store the content stream on storage 264.

In block 306, the content stream is at least partially played. For example, in response to DVR 101 receiving user input from a remote control, DVR 101 may play a stored content stream, which represents a television program. DVR 101 may play the stored content stream by reading the stored content stream from storage 264 and streaming the content stream to a television set to which DVR 101 is connected.

In block 308, it is determined whether the end of the content stream has been reached. For example, DVR 101 may determine whether the last part of the content stream has been streamed to the television set. If the end of the content stream has been reached, meaning that the entire content stream has been played completely, then control passes to block 314. Otherwise, control passes to block 310.

In block 310, it is determined whether user input, which instructs the DVR to stop playing the content stream, has been received. For example, DVR 101 may determine whether a user has pressed a "stop" button (or some other button that instructs DVR 101 to stop playing the content stream) on a remote control. If user input that instructs the DVR to stop playing the content stream has been received, then control passes to block 312. Otherwise, the content stream continues to play, and control passes back to block 308.

In block 312, it is determined whether a least a specified portion of the content stream has been played. For example, DVR 101 may determine whether at least 90% of the content stream has been played, or whether at least 55 minutes of the content stream have been played, or whether some other specified threshold, which indicates that the content stream was almost finished when the user input was received in block 310, has been crossed. If at least the specified portion of the content stream has been played, then control passes to block 314. Otherwise, control passes to block 324.

In block 314, a menu, referred to herein as the "save or delete menu," is displayed. The menu is sometimes alternatively called the "delete dialog." The menu comprises selectable options for (a) deleting the stored content stream, (b) not deleting the stored content stream (i.e., retaining the stored content stream), and (c) one or more other options that, when selected, will cause corresponding advertisements to be played or displayed, as is described below.

For example, DVR 101 may cause a connected television set to display a screen or dialog box that comprises options that the user can select using a remote control. Besides the "delete" and "don't delete/save" options discussed above, the screen or dialog box also may include an option that says "Interested in music from this program?" and/or an option that says "Tell me more about . . . " followed by the name of a product that was shown, heard, or otherwise referenced in the television program, for example. The options may be visually displayed and/or audibly spoken.

Figure 5:
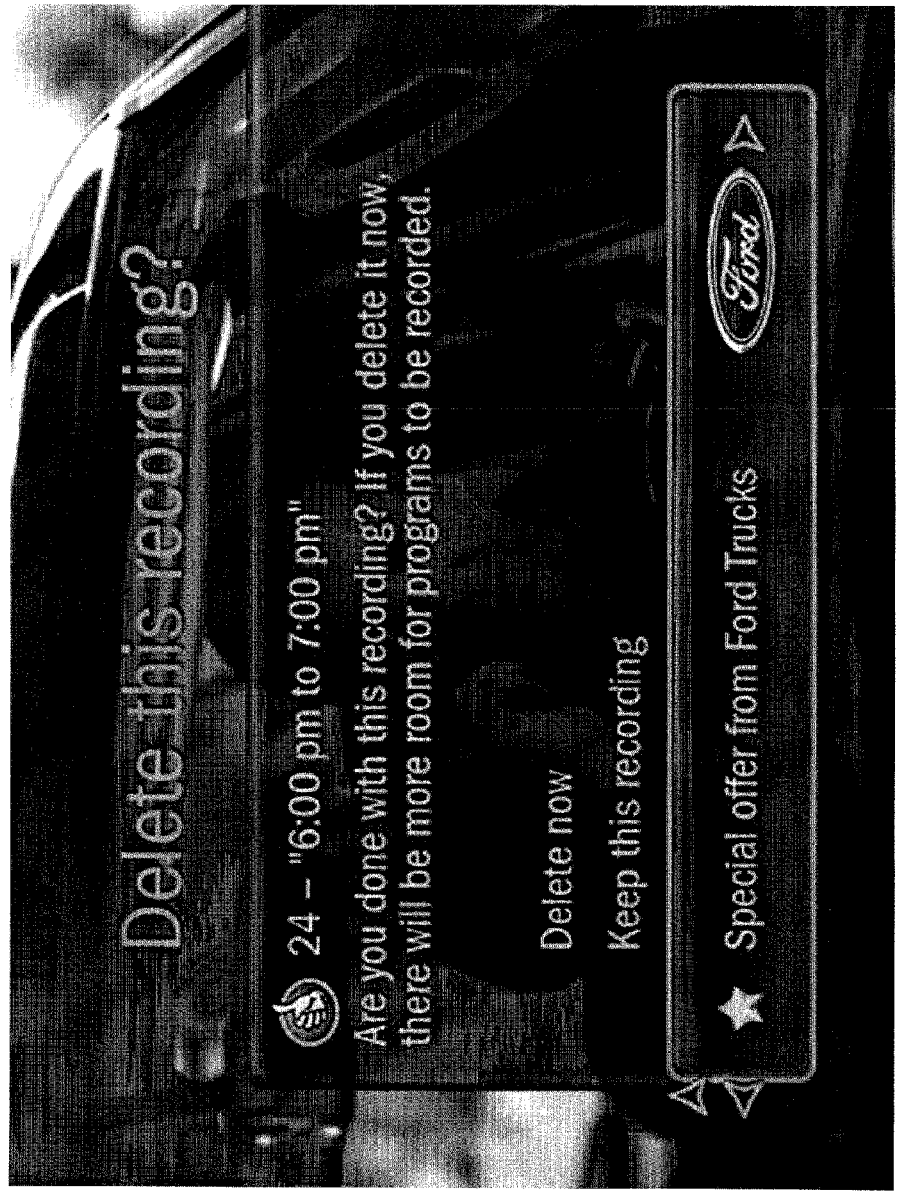
FIG. 5 illustrates an example of an enhanced save or delete menu according to an embodiment of the invention.

FIG. 5 illustrates an example of an enhanced save or delete menu according to an embodiment of the invention. In addition to the usual options of "Delete now" and "Keep this recording," the menu includes another option that reads "Special offer from Ford Trucks." Selection of this other option might take the user to another menu such as that depicted in FIG. 6 below.

Referring again to FIG. 3, in block 316, user input, which indicates selection of at least one option, is received. For example, DVR 101 may receive commands from a remote control in response to a user pushing buttons on the remote control. The commands may instruct DVR 101 to cause one of the options to be highlighted, and to cause a highlighted option to be selected.

In block 318, it is determined whether the selected option is one of the options other than the "delete" option and the "don't delete/save" option—in other words, one of the "promotional" options referred to in block 314. DVR 101 may make such a determination, for example. If the selected option is either the "delete" option or the "don't delete/save" option, then control passes to block 322. Otherwise, if the selected option is one of the "promotional" options, then control passes to block 320.

Figure 6:
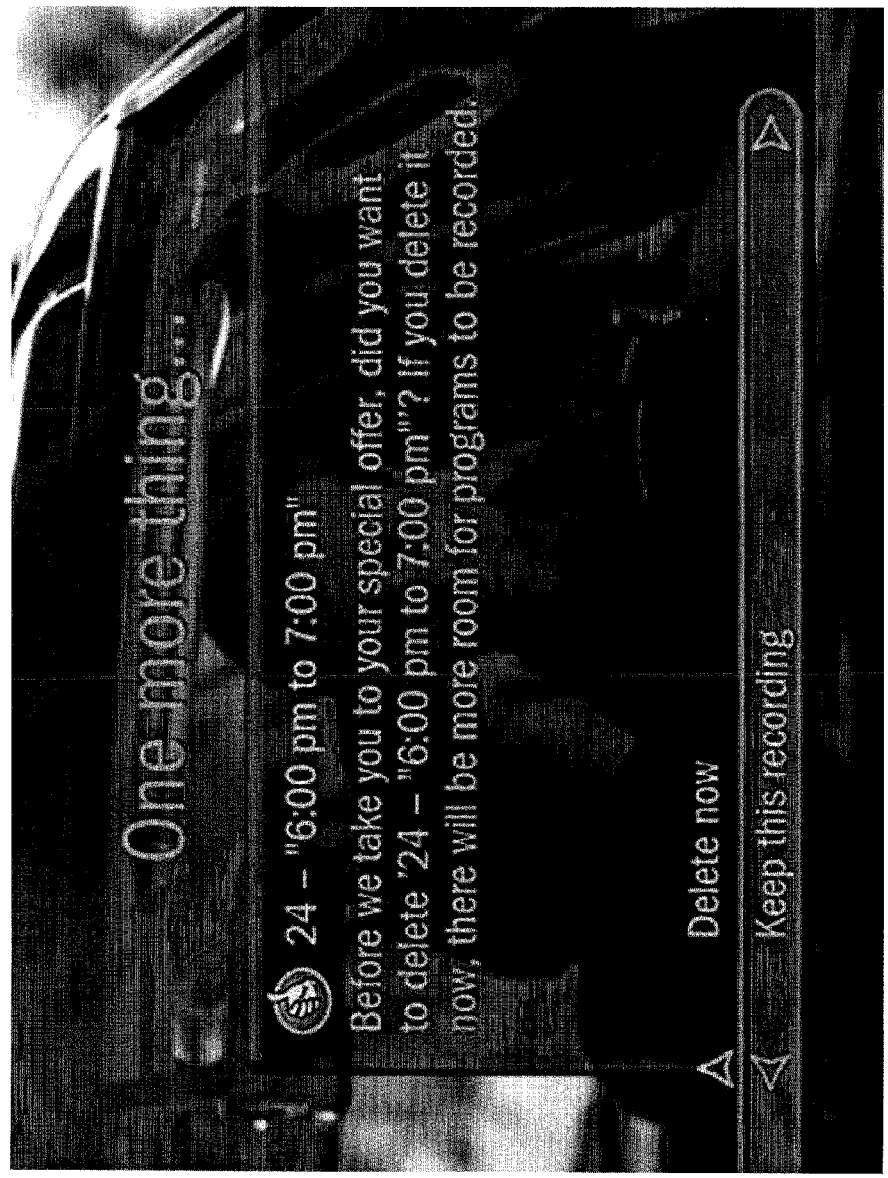
FIG. 6 illustrates an example of a menu that might be displayed after a user's selection of an option other than a "save" or "delete" option, according to an embodiment of the invention.

According to one embodiment of the invention, in block 320, an advertisement that is associated with the selected option is displayed or played. For example, if the selected option was "Tell me more about . . . " followed by the name of a product, then DVR 101 may cause an advertisement previously received from service provider 103 and stored within storage 264 to be streamed to the connected television set. The advertisement may be in the form of a televised commercial, for example. The subject of the advertisement may be the product mentioned in the selected option, for example. According to one embodiment of the invention, after the advertisement has been displayed or played, control passes back to block 314, at which time a new or different advertisement may be displayed along with the "save or delete" menu. According to another embodiment of the invention, the advertisement is not displayed immediately after the user's selection of a promotional option; instead, an additional dialog, such as the one shown with reference to FIG. 6, is presented first. FIG. 6 illustrates an example of a menu that might be displayed after a user's selection of an option other than a "save" or "delete" option, according to an embodiment of the invention. The menu shown in FIG. 6 allows the user to indicate, after selecting the other option, but before the special offer is displayed, whether the user would like to save or delete the program that the user has recently finished watching. Allowing the user to make the save or delete decision at this time can make the user's decision easier because the program is still fresh in the user's mind, and there may be less ambiguity as to what the user is being asked to decide.

Alternatively, in block 322, the stored content stream is saved or deleted in accordance with the selected option. For example, if the selected option was "delete," then DVR 101 may mark the space within storage 264 that was occupied by the just-played content stream as being available to store other content streams. For another example, if the selected option was "don't delete/save," then DVR 101 may maintain and preserve the content stream within storage 264, at least until the user decides to delete the content stream at a later time.

Alternatively, in block 324, the menu discussed with reference to block 314 is not displayed. For example, if DVR 101 determines that an insufficient amount of the content stream has been played to a user, then it might not be practical to ask the user whether the user would like to view advertisements or other promotional information that was shown, heard, or otherwise referenced in the content stream. Instead, DVR 101 may simply stop playing the content stream and cause the connected television set to display another menu, such as a menu that allows the user to resume playing the same content stream, or to begin playing a different stored content stream that represents another television program. A "program screen," to which the user is returned if the user doesn't select "delete," may display an advertisement, and/or link off a list of all advertisements relevant to the content stream. Alternatively, DVR 101 may simply return to playing, in real-time, a television program that currently is being received at DVR 101.

According to one embodiment of the invention, the "save or delete" menu comprises selectable options that correspond to (a) viewing an advertisement now or (b) viewing an advertisement later. In such an embodiment, if the user selects the option that corresponds to viewing the advertisement now, then DVR 101 plays the advertisement as described above. However, if the user selects the option that corresponds to viewing the advertisement later, then DVR 101 instead creates a "program shortcut" (e.g., a menu entry) in the "now playing" menu that lists programs that are currently available for viewing through the DVR. The "program shortcut" is associated with the advertisement that the user opted to view later. User selection of the "program shortcut" causes DVR 101 to play the advertisement. The advertisement may be stored on DVR 101 prior to the time that the "program shortcut" is created. Alternatively, DVR 101 may download the advertisement from a remote source in response to the user's selection of the "program shortcut" or in response to the creation of the "program shortcut."

3.1 Save/Delete Menu Screen Alternatives

As is discussed above with reference to block 320, in one embodiment of the invention, when a user selects an option other than the "delete" and "don't delete/save" options, DVR 101 causes an advertisement corresponding to the selected option to be displayed or played.

In one embodiment of the invention, in addition to or instead of options that cause DVR 101 to play an advertisement, the menu comprises one or more options that, when selected, cause DVR 101 to display additional menus and/or forms. For example, the options accompanied by the "save" and "delete" options may include an option that says "more options," the user selection of which causes DVR 101 to display further menus which comprise other user-selectable options such as those described herein. For another example, the options accompanied by the "save" and "delete" options may include options that, when selected by a user, cause DVR 101 to display a user interface through which the user can actually purchase a product or service.

For example, besides the "save" and "delete" options, the menu might contain one or more options that say, or are labeled, "buy . . . " followed by the name of a product or service. The options may be visually displayed and/or audibly spoken. In response to a user's selection of such an option, DVR 101 may cause a user interface to be displayed on the connected television set. The user can view a list of products and/or services, and the prices of each, within the user interface. Through the user interface, the user can select a product or service for purchase and then supply payment information (e.g., credit card information) and delivery information (e.g., shipping address information). DVR 101 may upload the payment information and delivery information to a remote source.

For another example, in response to a user's selection of a menu option that says "Interested in music from this program?", DVR 101 may either (a) display a menu or form that allows a user to purchase a compact disc (CD) that includes songs heard on the television program, or a pay-per-view program, or an advertisement, represented by the just-played content stream, (b) send, to the user's e-mail address, an e-mail message that comprises advertisements and/or offers for such a CD or the songs thereon, or (c) send, to a connected PC, signals that cause the PC to download the songs from an on-line music provider and store those songs on the PC and/or a portable digital music playing device connected to the PC. In various embodiments of the invention, DVR 101 may take a variety of other actions in response to the selection of various menu options; the actions described herein should not be considered an exhaustive list. For example, the DVR may send, to the user's e-mail account, an e-mail message that contains a coded URL. The URL may allow the user to complete a purchase on a website.

In one embodiment of the invention, the product that the user purchases through the DVR-displayed interface is actually downloaded and played by the DVR. For example, in response to the user purchasing a music video (possibly featuring music heard during the television program the user just watched), the DVR may automatically download the music video in digital form, store the music video on the DVR's storage, and then play the music video. There is no limitation on the kind of content that can be downloaded and displayed by the DVR. Other examples of content that the DVR may download and display include movie trailers and infomercials.

In one embodiment of the invention, in addition to or instead of the additional menu options discussed above, the screen or dialog box that comprises the "save" and "delete" options additionally comprises one or more advertisements which are played or displayed within the same screen or dialog box. Thus, in some embodiments of the invention, user selection of a menu option is not a prerequisite to the display of an advertisement at the conclusion of a television program.

In one embodiment of the invention, in addition to or instead of the additional menu options discussed above, the screen or dialog box that comprises the "save" and "delete" options additionally comprises a user interface or form through which a user can actually purchase products or services. Thus, in some embodiments of the invention, user selection of a menu option is not a prerequisite to the display of a "purchase" user interface or form at the conclusion of a television program.

Thus, available space within the existing screens usually shown by a DVR at the conclusion of a television program can be used more efficiently and profitably. Some techniques for deriving revenue from the display of advertisements through a DVR are described below.

Although embodiments of the invention described above refer to advertisements, offers, and/or menu options as being displayed within or concurrently with a "save or delete" menu, other embodiments of the invention are also possible. For example, in various embodiment of the invention, menu options and/or advertisements such as those discussed above might be displayed on or with menus and/or screens other than the "save or delete" menu, and at times other than after the playing of a television program.

For example, in one embodiment of the invention, a DVR displays (and/or audibly presents), in a "now playing" or "actions" menu or dialog, a list of television programs which have been recorded and are available for viewing, and/or a list of actions that can be taken relative to one or more such recorded television programs. With each television program for which advertisements or offers are available, a selectable option such as "see offers" might be displayed and/or audibly presented. Selection of such an option may cause the DVR to present a subsequent menu that comprises menu options that are associated with advertisements associated with the corresponding television program. Selection of these latter menu options may cause the DVR to play or display the associated advertisements. For another example, advertisements and/or menu options of the kind discussed above may be presented in a screen that lists search results for a program to record. For another example, advertisements and/or menu options of the kind discussed above may be presented in a screen that lists options for recording a program that has been found via a search. For another example, advertisements and/or menu options of the kind discussed above may be presented in a screen that lists contents of a "folder" that contains multiple episodes of a particular television series.

For another example, advertisements and/or menu options of the kind discussed above may be presented in a screen that is displayed during the time that a playing program has been paused, e.g., in response to a viewer's activation of a "pause" button on a remote control. In one embodiment of the invention, the advertisements and/or menu option that are displayed while the DVR is in "pause" mode may be selected based on the content that was being displayed at the time that the DVR entered "pause" mode. In one embodiment of the invention, while a content stream is being played, the DVR causes the display to show an indicator (e.g., in the corner of the display) which flashes when new relevant ads would appear in response to the user's selection of the "pause" feature at that time. In one embodiment of the invention, the "trickplay" bar (a bar which the DVR shows on the display when the user fast-forwards or rewinds a content stream), contains markers that indicate temporal locations at which the user's activation of the "pause" feature will cause the DVR to display advertisements and/or other information in the "pause" screen.

In one embodiment of the invention, when the DVR's user activates the "pause" feature, the DVR sends, to a server, the last minute of closed captioning information. The server uses this closed captioning information to select the advertisement or other information that will be displayed on the "pause screen." In one embodiment of the invention, the information displayed on the "pause screen" is non-commercial information which is determined to be of probably interest to the user; such information may be shown to entice the user to use the "pause" feature.

In one embodiment of the invention, a list of relevant advertisements is associated with an entry for a particular program in the DVR's "recording history." In such an embodiment of the invention, the DVR is capable of displaying the advertisements to a user at the user's discretion even after the user has caused the particular program to be deleted from the DVR's persistent storage.

In the discussion above, "advertisements" also may be surveys from networks and/or production companies. Such networks and/or production companies may be seeking viewer feedback on "pilot" programs. The download of such surveys may be restricted to a specified group or panel of viewers. Additionally or alternatively, "advertisements" may be videos that are associated with "continuing education" credits (e.g., for legal, medical, or real estate continuing education programs). After a user can viewed such a video, the DVR may display, to the user, a quiz that the user can complete using the DVR's controls. The user's successful and correct completion of the quiz questions may cause the continuing education credits to be granted to the user.

While in one embodiment of the invention, menu options and/or advertisements are shown in "save or delete" menus which normally are displayed after a television program has been substantially or entirely played, in various embodiments of the invention, such menu options and/or advertisements can be (additionally or alternatively) displayed by the DVR anywhere, at any time. However, as is discussed above, a goal of at least one embodiment of the invention is to present such menu options and/or advertisements in a place and time that will not disrupt the DVR user's viewing experience.

3.2 Deriving Revenue from DVR-Placed Advertising

According to one embodiment of the invention, representatives of service provider 103 (referred to herein simply as "the service provider") enter into an agreement with selling entities (e.g., companies and individuals) who want their products and/or services to be advertised. The service provider agrees to configure various DVRs to display advertisements in response to occurrences of specified events (e.g., user selection of corresponding menu options) in exchange for monetary compensation or other payment from the selling entities.

There are various ways in which such agreements might be reached. According to one embodiment of the invention, the service provider determines which products or services are going to be shown, heard, or otherwise referenced within a given television program. The service provider can make this determination, for example, by watching an early (e.g., East Coast) feed of the television program and noting which products and services are shown, heard, or otherwise referenced therein. Because DVR users often view recorded television programs long after those programs have been recorded on those users' DVRs, the service provider has adequate time to make the determination before advertisements need to be available via those users' DVRs. Alternatively, a broadcaster (e.g., a television network) may determine, from television program scripts, which products and/or services are going to be shown, heard, or otherwise referenced in the corresponding television programs. In one embodiment of the invention, the DVR provider offers, to the broadcaster, tools through which the broadcaster can offer, for sale to advertisers, space in the "save or delete" dialog for display of advertisements that relate to the products and/or services. The broadcaster optionally may request payment from the seller or provider of the products and/or services that are to be displayed in exchange for the display of the advertisements in the "save or delete" dialog. In one embodiment of the invention, the DVR provider offers, to the broadcaster, tools through which the broadcaster can place content of the broadcaster's own choosing in the "save or delete" dialog after a specified program. In one embodiment of the invention, a multichannel video programming distributor (MVPD) that distributes DVR products and/or services obtains television program scripts from those who are able to provide such scripts in advance of the time that the corresponding television programs are broadcast. In one embodiment of the invention, production companies and/or product placement agencies, who may know even sooner than networks the kind of content that is going to be shown in a particular television program, may interact with the DVR provider in the same manner in which a broadcaster interacts with the DVR provider as described above.

After determining which products and/or services are going to be shown, heard, or otherwise referenced, the service provider may contact the selling entities who provide those products and/or services, and offer to upload the selling entities' advertisements to specified DVRs in exchange for some payment from the selling entities. Because the DVRs may be implemented with built-in functionality that proactively informs the service provider as to which television programs are stored on the DVRs, and which of those television programs have not yet been played, the service provider can inform the selling entities precisely how many potential viewers of each television program there are. The service provider can use these numbers as leverage in reaching an agreement with the selling entities.

After an agreement has been reached, the service provider may upload advertisements and/or offers selected by the participating selling entities to selected DVRs on which the pertinent television program has been stored. Within the DVRs, an association is established between the selected advertisements/offers and the pertinent television program. For example, if a selling entity has agreed to pay the service provider for showing selected advertisements at the end of a particular television program, then the service provider may cause the selected advertisements to be uploaded to and stored on selected DVRs. Within the selected DVRs, the selected advertisements are associated with the particular television program.

Later, when the users of the selected DVRs have finished watching the particular television program (or performed other specified events relative to the particular television program), the selected DVRs display "save or delete" menus with additional options related to the advertisements associated with the particular television program, as is discussed above.

Thus, according to one embodiment of the invention, a selling entity essentially buys, from the service provider, the privilege of having the selling entity's menu option(s) displayed in the "save or delete" menu that will be shown by a DVR after a specified television program, selected by the selling entity, has been played by the DVR.

In various embodiments of the invention, representatives of the service provider may initiate contact with representatives of selling entities, or, alternatively, representatives of selling entities may initiate contact with representative of the service provider, assuming that the selling entities are aware that the service provider offers advertising and promotional services such as are described herein.

Regardless of how an agreement between the service provider and a selling entity is initially reached, the agreement may specify that the selling entity is to pay the service provider some additional sum for each DVR that actually causes the selling entity's advertisement to be displayed or played (e.g., in response to a DVR user selecting a menu option that corresponds to that advertisement). In one embodiment of the invention, each DVR is equipped with monitoring mechanisms that send, to service provider 103 over network 105, the identities of all advertisements that the DVR has displayed or played. The DVRs can transmit such information periodically, or in response to queries initiated by the service provider, for example. Thus, the service provider can determine how many times a particular advertisement has been displayed or played, and charge the appropriate selling entity accordingly.

Embodiments of the invention are described above with reference to negotiations and agreements pertaining to specific television programs. According to various embodiments of the invention, such negotiations and agreements may pertain, for example, (a) to a specified episode of a television program, (b) to all episodes or a specified television program, to all television programs that match specified characteristics (e.g., being in a specific genre, featuring a specified actor, etc.), or other aspects of content streams. Advertisements may be associated with a television program, keyword in a television program, a genre to which a television program belongs, demographics information about DVR users who watch a television program, and/or keywords that are contained in a closed captioning stream that is associated with a television program. Thus, advertisements may be "matched" to television programs based on the television program episode, a series to which the television program episode belongs, a genre to which the television program series belongs, actors that appear in the television program, a director of the television program, and/or other factors.

In an embodiment of the invention described above, a service provider determines how many potential viewers of each television program there are. In one embodiment of the invention, the service provider makes this determination based at least in part by determining how many DVRs have scheduled a recording of each television program. In one embodiment of the invention, the service provider makes this determination based at least in part on surveys and/or statistical sampling. In one embodiment of the invention, a DVR service maintains data about the profiles of users that watch certain programming, and about the propensities of these users to select certain advertisements.

3.3 Automated Bidding for Menu Option Slots

In some embodiments of the invention, the space available for displaying additional advertisement-related menu options in a "save or delete" menu may be limited. Additionally, in cases where more than one such menu option can be presented simultaneously, the order in which such menu options occur relative to each other may be of significant value to selling entities that pay for such menu options. For example, a selling entity might be willing to pay more to have its menu option displayed at the top of a list of advertisement-related menu options on a "save or delete" menu.

Therefore, in one embodiment of the invention, for each television program, selling entities can bid for menu option "slots" associated with that television program. In one embodiment of the invention, a "save or delete" menu's slots (which may be limited in number) are scheduled to be filled with the menu options of the highest-bidding selling entities after bidding concludes. In one embodiment of the invention, the first-listed menu option slot is filled with the menu option of the highest bidder; the second-listed menu option slot is filled with the menu option of the next-highest bidder; and so on. In one embodiment of the invention, the first-listed menu option is "highlighted" by default, so that if the DVR user does not select a different item, the first-listed menu option will be the one selected when the user presses "select," "enter," or a similar button on a remote control.

In one embodiment of the invention, the bidding process is automated. For example, in one embodiment of the invention, the service provider maintains a web server on which a server application executes. The server application accepts bids from multiple selling entities relative to specified television programs. Selling entities may submit such bids via web browser applications which transmit the submitted bids to the remote server application over a network (e.g., network 105). For example, the server application may transmit, to the selling entities' web browser applications, web pages that comprise forms through which the selling entities can enter bids. Upon submission of these forms, the web browser applications transmit the forms' contents to the server application, which updates locally stored bid data accordingly.

In one embodiment of the invention, for each television program for which bids can be submitted, the server application indicates (e.g., on a web page) a number of DVRs on which that television program is currently stored but currently un-played. Such a statistic may help bidding selling entities to appreciate the value of the slots upon which they are bidding. The server application can automatically obtain these statistics by communicating with the DVRs over a network or by querying a database in which information obtained from the DVRs has been stored.

In one embodiment of the invention, for each television program for which bids can be submitted, the server application identifies (e.g., on a web page) the products and/or services that are known to be shown, heard, or otherwise referenced in that television program. Such identifying information may help bidding selling entities to select the television program slots on which they would like to bid.

Bidding for the slots associated with a particular television program may remain open until a time specified by the service provider. In one embodiment of the invention, bidding for a particular television program's associated "save or delete" menu option slots begins as soon as at least one DVR has scheduled a current or future recording of the television program, and remains open as long as the particular television program remains stored, but un-played, on at least a specified number of DVRs.

The server application may be implemented in such a manner that each selling entity can opt to automatically increase its bid relative to a selected television program if that selling entity is outbid by another selling entity. In one embodiment of the invention, each selling entity can specify a maximum amount to which its bids can be automatically increased relative to a specified television program. In the event that a selling entity is outbid, the server application can automatically increment that selling entity's bid to be higher than the next-highest bid, unless doing so would cause the selling entity's bid to exceed the maximum amount specified by the selling entity.

In one embodiment of the invention, each selling entity can specify a "standing bid" through the server application. When a selling entity specifies a "standing bid," the server application automatically places bids on the selling entity's behalf for slots that are associated with any television program that is going to show or otherwise represent the selling entity's known products and/or services. In one embodiment of the invention, each "standing bid" is associated with a "distribution" threshold specified by the selling entity. When such a threshold is specified, no bids for slots corresponding to a particular television program will be automatically placed on the selling entity's behalf unless the particular television program is known to have been recorded by a number of DVRs that is at least as high as the specified threshold.

In one embodiment of the invention, advertisement placement is automated. For example, according to one embodiment of the invention, an advertiser authors his own advertisement based on one or more of a plurality of specified templates. After authoring the advertisement, the advertiser uses a web-driven "self service" interface to indicate where the advertisement is to be placed.

3.4 Tagging Television Programs with Advertisement IDS

According to one embodiment of the invention, "tags" are placed into content streams that are streamed to DVRs (e.g., by broadcaster 102). These tags are codes which are not visible to a human viewer, but which are detectable by a DVR which receives the content stream. The tags identify the products and/or services that will be shown, heard, or otherwise referenced in the television program that the content stream represents.

In one embodiment of the invention, in generating the additional menu options for the "save or delete" menu as described above, a DVR determines, from the tags embedded in a content stream, which products and/or services were shown, heard, or otherwise referenced in that content stream.

In response to determining these products and/or services, the DVR generates a "save or delete" menu which comprises menu options which correspond to these products and/or services, if such corresponding menu options or advertisements corresponding to those menu options are available on the DVR.

In one embodiment of the invention, each tag additionally indicates an amount that a selling entity is willing to pay to have an advertisement or corresponding menu option displayed. Prior to the time that the tags are placed into the content stream, the selling entities that are willing to pay to have advertisements or corresponding menu options displayed may be ranked by the amount that they are willing to pay. In addition to the amount that a particular selling entity is willing to pay, a tag also may indicate the particular selling entity's rank relative to other selling entities that also were willing to pay. Advertisements and/or menu options corresponding to the tags with the highest "N" amounts may be selected for display in the "save or delete" menu.

3.5 Adjusting Menu Options Based on Hit Rates

According to one embodiment of the invention, DVRs track how often users select each promotional menu option that is presented in addition to the "don't delete/save" and "delete" options in the "save or delete" menu. The DVRs transmit this "hit rate" information to service provider 103. In one embodiment of the invention, service provider 103 uses this "hit rate" information to re-order the menu options; menu options that are selected often may be placed closer to the top of the list of menu options, while menu options that are selected less often may be placed closer to the bottom of the list of menu options. Service provider 103 may transmit such "hit rate" based ordering information to the DVRs, and the DVRs may re-order their lists of menu options accordingly.

In one embodiment of the invention, information regarding which menu options were selected through a particular DVR is maintained for each DVR. Each DVR may transmit this information to service provider 103. Based on this information, service provider 103 may select future menu options and/or advertisements for placement on each DVR. For example, if a user tends to select menu options that correspond to a particular category of product or service, then service provider 103 may detect this pattern and, in the future, service provider 103 may send, to that user's DVR, additional menu options and/or advertisements that pertain to products and/or services in the same or similar categories.

3.6 Offers to Record Similar Television Programs

As is described above, in certain embodiments of the invention, menu options pertaining to advertisements may be displayed in a "save or delete" menu that is normally shown at the conclusion of a television program. In one embodiment of the invention, in addition to or instead of these menu options, a menu option reading "record other programs like this one" may be displayed (and/or audibly spoken) with other menu options in the "save or delete" menu (and/or in other screens and menus that the DVR displays, such as: a program screen that is shown before a program begins playing, a "recording history" that is shown after a program is deleted, a screen that displays results of a search for a program, etc.). In response to a user's selection of such a menu option, the user's DVR or service provider 103 determines a set of one or more categories into which the just-watched television program fits, and automatically configures the DVR to automatically record, in the future, one or more other television programs which also fit into those categories. Additionally or alternatively, the user's selection of such a menu option may cause the user's DVR to download, proactively, the one or more other television programs from service provider 103 without waiting for service provider 103 to broadcast those television programs at some future time.

In one embodiment of the invention, the menu options identify the titles of one or more other television programs which are determined to fit into the same categories as the just-watched television program. In one embodiment of the invention, service provider 103 causes a particular television program to be included within the list of menu options in response to reaching an agreement with a selling entity (such as a television network) that the selling entity will pay service provider 103 a specified amount in exchange for service provider 103 causing the particular television program to be included in the list.

3.7 Pay-Per-View and Other Implementations

Some "pay-per-view" services prohibit content streams from being stored within a DVR's storage for legal or other reasons. According to one embodiment of the invention, content streams flow from broadcaster 102 through DVR 101 without being stored on DVR 101. At the conclusion or beginning of the streaming of such a content stream, one or more advertisements and/or promotional menu options may be displayed on a DVR-generated screen, even though no portion of the content stream actually needs to be deleted from DVR 101. Thus, embodiments of the invention are not limited to the presentation of advertisements and promotional menu options on "save or delete" menu screens specifically. Advertisements and promotional menu options may be presented at the conclusion of "pay-per-view" content streams which are never actually stored on a DVR.

In one embodiment of the invention, DVR 101 causes one or more advertisements and/or promotional menu options to be displayed at the time that the DVR user stops watching live television (e.g., to begin watching a recorded program instead). The advertisements and/or promotional menu options displayed to the user may be selected based on characteristics of the live television program that the DVR user had been watching until that time, for example. Advertisements may be "surfaced" in a "channel banner" when the DVR user "rolls over" an advertising indicator icon in the "channel banner."

In one embodiment of the invention, the user's selection of one or more advertisements and/or promotional menu items displayed at the beginning of, or prior to, the streaming of a content stream causes credits to be placed in a user-associated account. In one embodiment of the invention, the user can apply such credits toward the payment for a "pay-per-view" content stream presentation. In one embodiment of the invention, the user can apply such credits toward the payment of DVR service fees.

3.8 Dynamic Advertisement Selection

In one embodiment of the invention, the advertisements or other promotional information displayed by the DVR in the "save or delete" menu may be selected dynamically based on various specified factors. For example, an advertisement about a product and/or company might be selected for display from among a group of advertisements about products and/or companies based on electronic program guide information. Electronic program guide information generally comprises metadata about programs. The metadata typically is provided to the DVR service provider by an electronic program guide provider. For each program, such metadata may include, for example, the title of the program, actors and actresses featured in the program, the program's director, keywords that pertain to the program, the program's rating (e.g., TV-G, TV-14, TV-MA, PG, R, etc.), and/or descriptive labels (e.g., adult situations, violence, brief nudity, etc.). For example, if the metadata associated with the program just viewed indicates that the program featured a particular actor, then an advertisement for a movie featuring that actor might be displayed in the "save or delete" menu. For another example, if the metadata associated with the program indicates that the program is "TV-G" rated, then an advertisement featuring products targeted toward children and families might be displayed.

For another example, the advertisement or other promotional information might be selected based on a genre to which the program belongs. For example, if the program is in a "home improvement" genre, then advertisements for home improvement and/or hardware stores may be selected for display. Such advertisements do not need to be directed toward sales. Such advertisements may be informational in nature. For example, an advertisement might comprise a 2-minute video that describes how one can tile a bathroom. Under such circumstances, the advertisement might feature brands and products associated with and/or offered by a home improvement and/or hardware store.

For another example, the advertisement or other promotional information might be selected dynamically based on information contained in the closed-captioning stream.

For another example, the advertisement or other promotional information might be selected dynamically based on the viewer's past viewing behavior, and/or the viewer's specified preferences. For example, a DVR may keep a history of the commercials that the viewer has watched (i.e., not skipped over without viewing). An advertisement or other promotional information that pertains to a category that is associated with the most viewed commercials may be selected for presentation in the "save or delete" menu. For another example, a DVR may keep a history of the programs that the viewer has watched. A majority of these programs may be associated with a same program category. An advertisement or other promotional information that pertains to a product or company that is associated with that program category may be selected for presentation in the "save or delete" menu.

For another example, the advertisement or other promotional information might be selected dynamically based on information known about the DVR owner's geographic location and/or demographic characteristics. For example, at the time that the DVR's owner registers the DVR, the DVR might transmit, to a DVR service provider, information such as the owner's street address, zip code, age, gender, race, income, etc. Advertisements or other promotional information selected for display by a particular DVR may be selected based on such information that is associated with the particular DVR's owner. Additionally or alternatively, advertisements or other promotional information may be selected based on demographic data that is associated with the "typical" viewer (e.g., a composite or average viewer) of a particular television program.

In one embodiment of the invention, advertisements and promotional information eligible for presentation are filtered, prior to presentation, based on whether the DVR is currently is in a "safe" mode (e.g., "TiVo KidZone"). If the DVR is in a "safe" mode, then certain advertisements deemed unsuitable for children may be omitted from selection for display in the "save or delete" menu dialog. Additionally or alternatively, if the DVR is currently in a "safe" mode, then certain advertisements that are associated with or targeted toward a children's demographic may be selected for display over other advertisements. Thus, in one embodiment of the invention, advertisements are selected based on a current "mode" to which the DVR has been set, typically by the DVR's owner. In one embodiment of the invention, the DVR supports different modes or views for different adults in a household. In such an embodiment, the DVR may be able to determine that a particular adult is currently using the DVR (e.g., due to the DVR having been directed to a "now playing" list that is associated with the particular adult). In response to such a determination, the DVR may display advertisements that are targeted toward the particular adult.

4.0 Hardware Overview

Figure 4:
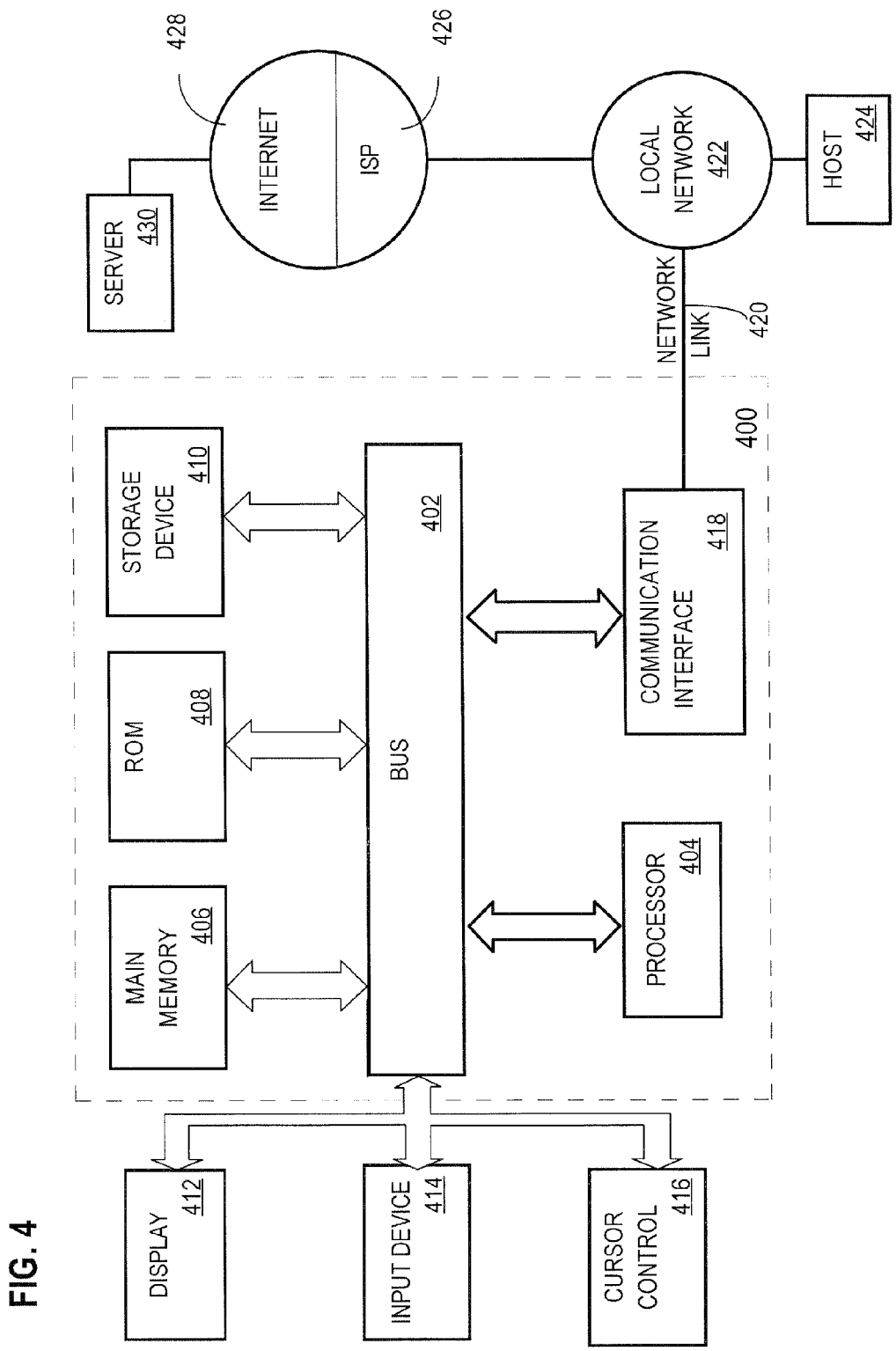
FIG. 4 is a block diagram of a system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for presenting information through a multimedia device, the method comprising: receiving, at the multimedia device, user input whose receipt causes the multimedia device to cease playing a content stream; in response to receiving the user input, determining whether a point within a specified threshold of an end of the content stream has been reached; in response to receiving the user input and determining that the point within the specified threshold of the end of the content stream has been reached, displaying particular information to a user of the multimedia device, the particular information comprising at least one advertisement, and the particular information also comprising a menu that comprises a user-selectable option, user selection of which causes the multimedia device to delete the content stream.

2. A method as recited in claim 1, wherein the particular information comprises a second user-selectable option, and further comprising: receiving particular user input that indicates selection of the second user-selectable option; and in response to receiving the particular user input, displaying, to the user, a subsequent menu, wherein the subsequent menu comprises at least one of:
    (a) a user-selectable option, user selection of which causes the multimedia device to display, to the user, an interface through which the user can purchase a product or service;
    (b) a user-selectable option, user selection of which causes the multimedia device to display, to the user, an interface through which the user can request information about a product or service to be sent to the user;
    (c) an interface through which the user can submit an answer to a question via the multimedia device;
    (d) a user-selectable option, user selection of which causes the multimedia device to send a request to a request-receiving entity, wherein the request asks the request-receiving entity to send specified information to at least one of (i) a specified e-mail address and (ii) a specified postal address;
    (e) a user-selectable option, user selection of which cause the multimedia device to provide the user with an ability to schedule an upcoming content stream for recording; and
    (f) an interface through which the user can request downloading of a particular video for later viewing.

3. A method as recited in claim 1, wherein the particular information comprises a second user-selectable option, and further comprising: receiving particular user input that indicates selection of the second user-selectable option; and in response to receiving the particular user input, charging a selling entity a specified monetary amount.

4. A method as recited in claim 1, wherein the particular information comprises a second user-selectable option, and further comprising: receiving particular user input that indicates selection of the second user-selectable option; and in response to receiving the particular user input, recording data that indicates that the second user-selectable option was selected.

5. A method as recited in claim 4, further comprising: displaying one or more additional user-selectable options that were selected for display based on the data; wherein the one or more additional user-selectable options were selected for display due to the one or more additional user-selectable options being in a same category as the second user-selectable option.

6. A method as recited in claim 1, wherein displaying the particular information to the user of the multimedia device further comprises displaying titles of one or more television programs that the user can select in order to cause the multimedia device to record corresponding television programs at a later time.

7. A method as recited in claim 1, further comprising selecting the particular information for display from among a plurality of particular information items based at least in part on electronic program guide information.

8. A method as recited in claim 1, further comprising selecting the particular information for display from among a plurality of particular information items based at least in part on one or more words in a closed caption stream.

9. A method as recited in claim 1, further comprising selecting the particular information for display from among a plurality of particular information items based at least in part on previous television viewing behaviors of the user.

10. A method as recited in claim 1, further comprising selecting the particular information for display from among a plurality of particular information items based at least in part on whether the multimedia device is currently configured to operate according to constraints associated with a specified mode of operation.

11. A method as recited in claim 1, further comprising selecting the particular information for display from among a plurality of particular information items based at least in part on geographical address information that is associated with an owner of the multimedia device.

12. A method as recited in claim 1, further comprising selecting the particular information for display from among a plurality of particular information items based at least in part on demographic information that is associated with an owner of the multimedia device.

13. The method of claim 1, wherein displaying the particular information to the user of the multimedia device further comprises displaying one or more particular user-selectable menu options in an order that is based on a frequency with which each of the one or more particular user-selectable menu options was previously selected.

14. The method of claim 1, further comprising: the multimedia device downloading the advertisement in response to receiving the user input.

15. An apparatus for presenting information through a multimedia device, the apparatus comprising: a subsystem, implemented at least partially in hardware, that receives user input whose receipt causes the multimedia device to cease playing a content stream; a subsystem, implemented at least partially in hardware, that in response to receiving the user input, determines whether a point within a specified threshold of an end of the content stream has been reached; a subsystem, implemented at least partially in hardware that in response to receiving the user input and determining that the point within the specified threshold of the end of the content stream has been reached, displays particular information to a user of the multimedia device, the particular information comprising at least one advertisement, and the particular information also comprising a menu that comprises a user-selectable option, user selection of which causes the multimedia device to delete the content stream.

16. An apparatus as recited in claim 15, wherein the particular information comprises a second user-selectable option, and the apparatus further comprising: a subsystem, implemented at least partially in hardware, that receives particular user input that indicates selection of the second user-selectable option; a subsystem, implemented at least partially in hardware, that causes a subsequent menu to be displayed to the user in response to the particular user input being received, wherein the subsequent menu comprises at least one of:
  (a) a user-selectable option, user selection of which causes the multimedia device to display, to the user, an interface through which the user can purchase a product or service;
  (b) a user-selectable option, user selection of which causes the multimedia device to display, to the user, an interface through which the user can request information about a product or service to be sent to the user;
  (c) an interface through which the user can submit an answer to a question via the multimedia device;
  (d) a user-selectable option, user selection of which causes the multimedia device to send a request to a request-receiving entity, wherein the request asks the request-receiving entity to send specified information to at least one of (i) a specified e-mail address and (ii) a specified postal address;
  (e) a user-selectable option, user selection of which cause the multimedia device to provide the user with an ability to schedule an upcoming content stream for recording; and
  (f) an interface through which the user can request downloading of a particular video for later viewing.

17. An apparatus as recited in claim 15, wherein the particular information comprises a second user-selectable option and the apparatus further comprising:
  a subsystem, implemented at least partially in hardware, that receives particular user input that indicates selection of the second user-selectable option; and
  a subsystem, implemented at least partially in hardware, that causes a selling entity to be charged a specified monetary amount in response to the particular user input being received.

18. An apparatus as recited in claim 15, wherein the particular information comprises a second user-selectable option and the apparatus further comprising: a subsystem, implemented at least partially in hardware, that receives particular user input that indicates selection of the second user-selectable option; and a subsystem, implemented at least partially in hardware, that records, in response to the particular user input being received, data that indicates that the second user-selectable option was selected.

19. An apparatus as recited in claim 18, further comprising:
  a subsystem, implemented at least partially in hardware, that causes one or more additional user-selectable options, which were selected for display based on the data, to be displayed;
  wherein the one or more additional user-selectable options were selected for display due to the one or more additional user-selectable options being in a same category as the second user-selectable option.

20. An apparatus as recited in claim 15, wherein the subsystem that causes the particular information to be displayed to the user of the multimedia device also causes titles of one or more television programs, which the user can select in order to cause the multimedia device to record corresponding television programs at a later time, to be displayed to the user.

21. A non-transitory computer-readable medium storing one or more sequences of instructions for presenting particular information through a multimedia device, which instructions, when executed by one or more processors, cause the one or more processors to carry out steps of: receiving, at the multimedia device, user input whose receipt causes the multimedia device to cease playing a content stream; in response to receiving the user input, determining whether a point within a specified threshold of an end of the content stream has been reached; in response to receiving the user input and determining that the point within the specified threshold of the end of the content stream has been reached, displaying particular information to a user of the multimedia device, the particular information comprising at least one advertisement, and the particular information also comprising a menu that comprises a user-selectable option, user selection of which causes the multimedia device to delete the content stream.

22. A non-transitory computer-readable medium as recited in claim 21, wherein the particular information comprises a second user-selectable option, and wherein the instructions, when executed by the one or more processors, cause the one or more processors to carry out steps of: receiving particular user input that indicates selection of the second user-selectable option; and in response to receiving the particular user input, charging a selling entity a specified monetary amount.

23. A non-transitory computer-readable medium as recited in claim 21, wherein the particular information comprises a second user-selectable option, and wherein the instructions, when executed by the one or more processors, cause the one or more processors to carry out steps of:
receiving particular user input that indicates selection of the second user-selectable option; and in response to receiving the particular user input, recording data that indicates that the second user-selectable option was selected.

24. A non-transitory computer-readable medium as recited in claim 23, wherein the instructions, when executed by the one or more processors, cause the one or more processors to carry out steps of:
displaying one or more additional user-selectable options that were selected for display based on the data;
wherein the one or more additional user-selectable options were selected for display due to the one or more additional user-selectable options being in a same category as the second user-selectable option.

25. A non-transitory computer-readable medium as recited in claim 21, wherein displaying the particular information to the user of the multimedia device further comprises displaying titles of one or more television programs that the user can select in order to cause the multimedia device to record corresponding television programs at a later time.

26. A non-transitory computer-readable medium as recited in claim 21, wherein the particular information comprises a second user-selectable option, and the instructions further comprising:
receiving particular user input that indicates selection of the second user-selectable option; and in response to receiving the particular user input, displaying, to the user, a subsequent menu, wherein the subsequent menu comprises at least one of:
(a) a user-selectable option, user selection of which causes the multimedia device to display, to the user, an interface through which the user can purchase a product or service;
(b) a user-selectable option, user selection of which causes the multimedia device to display, to the user, an interface through which the user can request information about a product or service to be sent to the user;
(c) an interface through which the user can submit an answer to a question via the multimedia device;
(d) a user-selectable option, user selection of which causes the multimedia device to send a request to a request-receiving entity, wherein the request asks the request-receiving entity to send specified information to at least one of (i) a specified e-mail address and (ii) a specified postal address;
(e) a user-selectable option, user selection of which cause the multimedia device to provide the user with an ability to schedule an upcoming content stream for recording; and
(f) an interface through which the user can request downloading of a particular video for later viewing.

* * * * *